United States Patent [19]
Boatman et al.

[11] Patent Number: 5,892,690
[45] Date of Patent: Apr. 6, 1999

[54] ENVIRONMENT MONITORING SYSTEM

[75] Inventors: Joey F. Boatman, Boulder, Colo.;
Bryan S. Reichel, Hastings, Minn.

[73] Assignee: PureChoice, Inc., Edina, Minn.

[21] Appl. No.: 814,794

[22] Filed: Mar. 10, 1997

[51] Int. Cl.[6] .............................. G06F 17/00; G05B 23/02
[52] U.S. Cl. ................................ 364/528.11; 364/528.13; 340/825.06; 379/102.01
[58] Field of Search .............................. 364/550, 571.03, 364/920, 927.2, 935.2, 940, 557, 558, 580, 528.01, 528.11, 528.12, 528.13; 707/1, 10; 340/870.01, 870.02, 870.03, 825.06, 825.08; 379/102.01, 102.02

[56] References Cited

U.S. PATENT DOCUMENTS

| | | | |
|---|---|---|---|
| 4,823,290 | 4/1989 | Fasack et al. ............................ | 364/550 |
| 5,311,451 | 5/1994 | Barrett .................................... | 364/550 |
| 5,400,246 | 3/1995 | Wilson et al. ........................... | 364/146 |
| 5,491,473 | 2/1996 | Gilbert ................................. | 340/870.01 |
| 5,491,789 | 2/1996 | Aramaki et al. ....................... | 364/267 |
| 5,553,006 | 9/1996 | Benda ..................................... | 364/550 |
| 5,617,337 | 4/1997 | Eidler et al. ........................ | 364/551.01 |
| 5,687,098 | 11/1997 | Grumstrup et al. .................... | 364/550 |

OTHER PUBLICATIONS

MPM–4100 IAQ Solopac: Indoor Air Quality Measuremet System, brochure, Solomat, a Neotronics company, Norwalk, Connecticut, 1994.

Q–Com, Inc., Irvine, California, brochure (prior art) No date.

Primary Examiner—John Barlow
Assistant Examiner—Bryan Bui
Attorney, Agent, or Firm—Westman, Champlin & Kelly

[57] ABSTRACT

An environment monitoring system and method for systematically and continuously monitoring an environment. The system and method includes a data acquisition system which is programmed to systematically collect environment data for a site. The data acquisition system includes sensors coupled to a data storage device having a remote access device for electronic access from a remote system. Data may be uploaded to a remote database for storing environment data from many sites. The remote database includes a remote access device so that the data storage devices of various data acquisition sites can be electronically coupled to the remote database for centralized data collection and storage.

20 Claims, 5 Drawing Sheets

ENVIRONMENT MONITORING SYSTEM

BACKGROUND OF THE INVENTION

The present invention relates to a system and method for systematically and continuously monitoring environment quality. In particular, the system of the present invention relates to an environment monitoring system, which has application for monitoring the quality of air or water at a particular location.

There is an increasing effort to monitor environment quality, such as air quality or water quality. In particular, smoke, chemicals and toxins may negatively effect air and water quality. Poor air or water quality may have a negative effect on the health and well being of the population.

Certain environments are more susceptible to pollutants that negatively effect air quality, such as a bar, restaurant, nightclub or casino where a high percentage of people smoke. Other environments require a consistent and predetermined air quality, which is free from pollutants, toxins and chemicals, such as hospitals, nursing homes, pharmaceutical manufacturing facilities or other manufacturing facilities that require "clean rooms." In such environments, efforts are made to control air quality so that air quality is at an acceptable level.

Various filtering systems may be used to control air quality and to clear the air or water of unwanted substances or residue. Different environments have different filtering requirements depending upon the quality and quality requirements. Thus, it is desirable to have a systematic device for monitoring air or water quality in order to effectively filter unwanted residue from a particular environment.

There has been an increasing focus on the negative health effects of poor air or water quality. Thus, it is desirable to have a system for monitoring and documenting air or water quality to maintain records for negating correlations between air quality at a particular site and any health conditions of people who live, work or visit the particular site. Such records may be used to negate liability for health conditions which are alleged to be caused by prolonged exposure to certain environments.

SUMMARY OF THE INVENTION

The environment monitoring system of the present invention includes a data acquisition system for collecting and recording environment data at various sites. The data acquisition system includes sensors and a data storage device coupled to the sensors. The data acquisition system is programmed to systematically and continuously collect environment data from the sensors. Data is measured by the sensors and transmitted to the site data storage device.

Preferably, data from the many sites is centrally accumulated and stored in a remote comprehensive database. The remote comprehensive database is designed to store data by site and includes remote access software for electronically communicating with a remote access device at each data site for accumulating data for the comprehensive database.

DETAILED DESCRIPTION OF THE PREFERRED EMBODIMENTS

Figure 1:
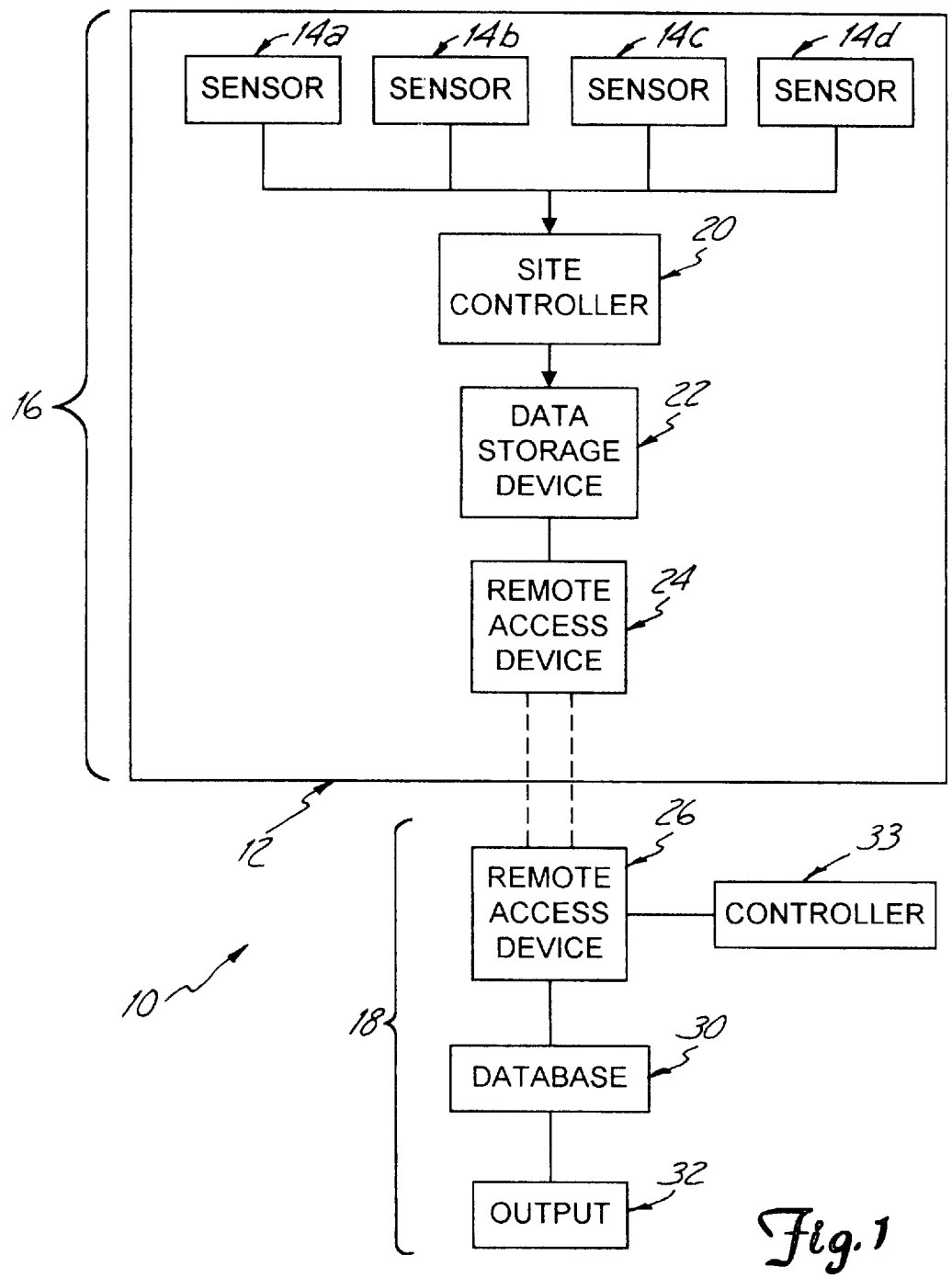
FIG. 1 is a schematic diagram of the operation of the system for monitoring environment quality of the present invention.

FIG. 1 is a schematic diagram of the operation and components of the environment monitoring system 10 of the present invention. As shown in FIG. 1, the present invention relates to a system for monitoring the environment quality of a particular site 12 which can be used for monitoring the air quality inside a building. As shown, a plurality of sensors 14a–d are employed at site 12 for measuring air quality. Although the monitoring system of the present invention is described in relation to monitoring air quality, it should be understood that the monitoring system of the present invention has application beyond monitoring air quality, such as monitoring water quality.

The system 10 of the present invention includes a site monitoring assembly 16 (or site data acquisition system) and a remote data collection system 18. The site monitoring assembly 16 includes sensors 14a–d, a site controller 20, a data storage device 22 and a remote access device 24. As shown, each sensor 14a–d is coupled to the site controller 20 for initiating collection of data from the sensors 14a–d. The site controller 20 schedules data collection by the sensors 14a–d. The site controller 20 may be coupled to a plurality of sensors 14a–d for initiating collection of data from a plurality of sensors 14a–d or may be coupled to a single sensor 14a for initiating collection of data from a single sensor 14a.

The sensors 14a–d are coupled to the data storage device 22 for storing data of the sensors 14a–d. The data storage device 22 is preferably a data logger or a battery operated memory device for storing sensor data 14a–d. The data storage device 22 is coupled to a remote access device (modem) 24 so that the sensor data is available externally.

The site controller 20 initiates the collection of data from sensors 14a–d at predefined intervals and stores the measured air quality data to the memory of the data storage device 22. In particular, the site controller 20 is programmed to systematically and continuously collect data from sensors 14a–d. The measurement intervals can be preprogrammed into the site controller 20 or can be programmed by an operator at a monitoring or data acquisition site 12.

The remote data collection system 18 is physically separate from the testing or data acquisition sites 12 and is a facility for systematically collecting and storing data from various testing sites for analysis. The remote data collection system 18 includes a remote access device (i.e. modem) 26, a database 30 and an output device 32. The database 30 is a comprehensive database and defines a remote centralized data storage system for storing data from various monitoring or data acquisition sites. The remote access device 26 of the remote data collection assembly 18 is designed to electronically communicate with the remote access device 24 of the site monitoring assembly 16 for uploading data from sensors 14a–14d to database 30.

Preferably, a system controller 33 is coupled to the data collection system 18 for initiating access to the site monitoring assemblies 16. In particular, preferably the system controller 33 is programmed to access various site monitoring assemblies 16 at defined intervals for uploading data from the data storage devices 22 of various site monitoring assemblies 16. Alternatively, in another embodiment of the invention, individual site controllers 20 of various monitoring or data acquisition sites 12 may initiate access to the remote data collection system 18 to upload data from a data storage device 22 to the remote central database 30.

Figure 1A:
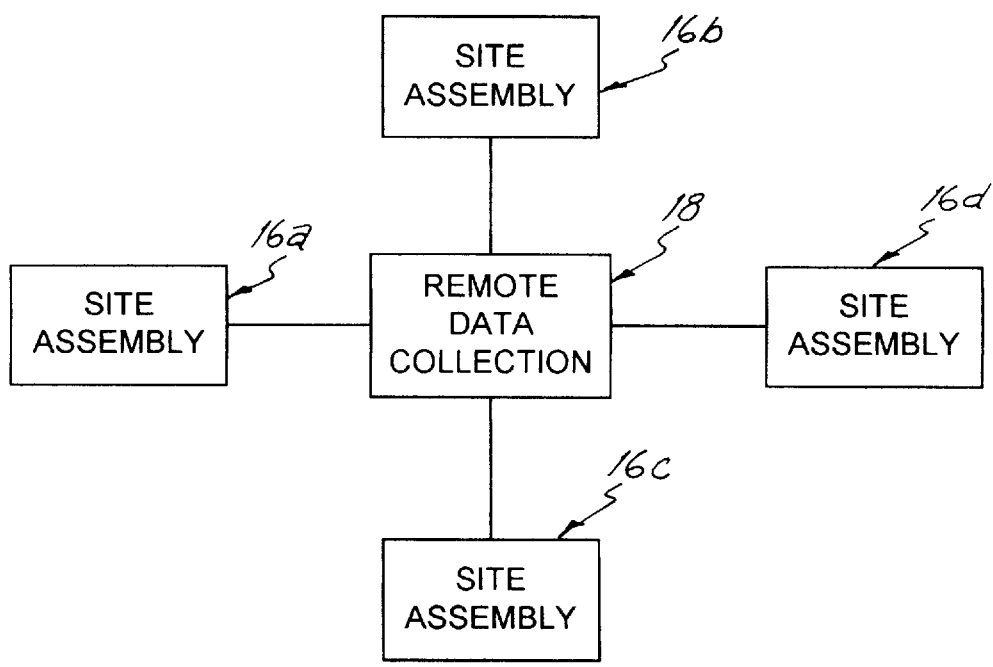
FIG. 1A is an illustrative view of a plurality of site monitoring assemblies coupled to a central remote data collection system of the present invention.

FIG. 1A is an illustrative view of the operation of the remote data collection system 18 for maintaining data from a plurality of site monitoring assemblies 16a–n. Each site 12 is coupled to the remote data collection system 18 at various time intervals, based upon the measurement time intervals of various site monitoring assemblies 16. Preferably, the format for data collected by sensors 14a–d and stored to the data storage device 22 includes sensor identification number, an air quality measurement, a date of measurement and a time of measurement for each sensor 14a–d.

Each data storage device 22 for each data acquisition site 12 includes an alphanumeric site identification number. When data is transmitted from the data storage device 22 of a site monitoring assembly 16a–n to database 30 of the remote data collection system 18, the data for each sensor 14a–d (i.e. sensor identification number, air quality measurement, date and time) as well as the site identification number of each site 12 is transmitted. The data transferred for each site is stored separately in the remote database 30, based upon the site identification number.

The output device 32 coupled to database 30 of the remote data collection system 18 may be a printer, a removable data storage device (e.g. floppy disc or a CD ROM disc or an Internet™ Web Page). The remote data collection system 18 may manage data for the sites and provide periodic reports (data) of air quality, in printed form, by disk or via the Internet™ for review and analysis by the individual sites 12.

Additionally, the remote database 30 may be connected to a distributed wide area network (e.g. Internet™) so that the database 30 can be directly accessed by individual sites 12 for review. Preferably, accessibility of the data on a wide area network would be limited by passcodes to protect the confidentiality of the data. Only authorized personnel from each site 12 would be able to access the data from a particular site 12 by using the correct passcode.

Figure 2:
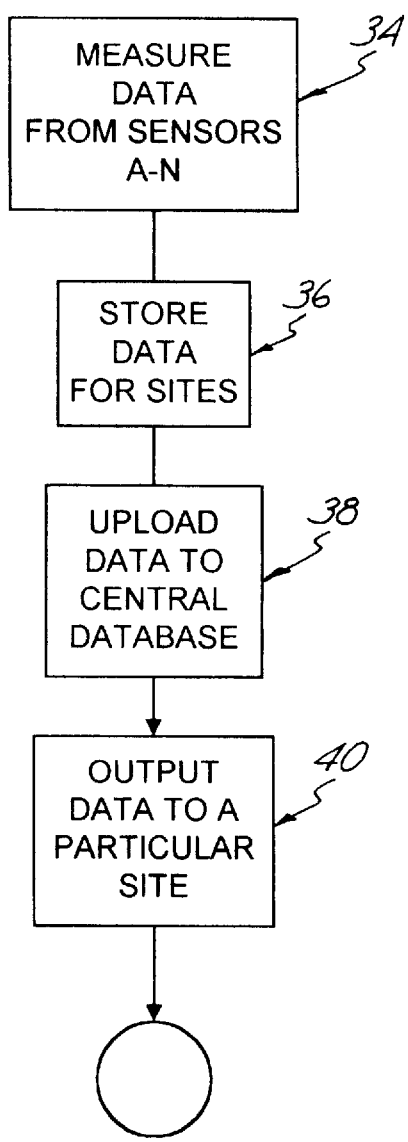
FIG. 2 is a flow chart illustrating operation of the components of the monitoring system of the present invention.

FIG. 2 is a flow chart illustrating operation of the system of the present invention for systematically and automatically collecting data from individual sites at selected intervals and uploading the data to the centralized database 30 for distribution and analysis. As illustrated by block 34, site controller 20 selectively polls sensors 14a–b at selected time intervals to measure air quality and upload the measured data to the data storage device 22 as illustrated by block 36. The rate at which data is polled from the sensors 14a–d depends upon the configuration of the site controller 20. The rate may be preprogrammed into the system or the site controller 20 may include a user interface for inputting the rate for polling sensors 14a–14b.

As illustrated by block 38, data is uploaded or transferred from the data storage device 22 of each site 12 to the remote database 30. This data transfer may be initiated by the remote data collection system 18 or the site monitoring assembly 16 (or data acquisition system), either automatically or manually. Either the site controller 20 or controller 33 may be programmed to automatically initiate the transfer of data from the data storage devices 22 of the data acquisition sites 12 to the central remote database 30. As illustrated by block 40, the transferred data from the site monitoring assembly 16 is stored in the database relative to the site identification number. The frequency at which data is uploaded to the central database 30 depends upon the rate at which data is polled from the sensors 14a–d and preferably is a variable that may be programmed into the system as desired.

Thus, as described, the system of the present invention assures that air quality is automatically and systematically monitored without reliance upon schedules or priorities of personnel or individuals at a particular site. As previously explained, the environment data collected by the sensors 14a–d may be analyzed for controlling air quality or may be used for maintaining air quality records. For example, the data may be used to determine the frequency at which filtering devices, which are used to filter residues from the air, need to be changed.

Sensors 14a–n may be positioned at various distributed locations in a particular site 12. The number of sensors shown in FIG. 1 is for illustrative purposes only and the number of sensors can vary per cubic foot depending upon the air quality monitoring accuracy required. Preferably, a fixed system of sensors is used where a plurality of sensors 14a–n are fixedly mounted to walls or other surfaces at a particular site and are operably wired to the site controller 20 and data storage device 22 for systematically and continuously collecting air quality data.

Alternatively, the sensors 14a–n employed may be mobile sensors 14a–n. Data may be collected by the mobile sensors 14a–n and uploaded via a remote access device 24 for electronic transfer to the central database 30 of the remote data collection system 18. Data collection from the mobile sensors 14a–n would be controlled by a central processor coupled to the mobile sensors 14a–n for automatic and systematic control.

Various sensors 14a–n may be employed for testing various air quality attributes. Examples of types of sensors that may be employed include smoke or particle sensors, volatile organic compound sensors, or carbon monoxide sensors. Preferably, the system 10 employs a particle sensor and a volatile organic compound sensor. Other sensors that produce an electronic signal proportional to the presence of foreign substances, such as toxins or other chemicals may be employed and the invention is not intended to be limited to the particular sensors described.

Figure 3:
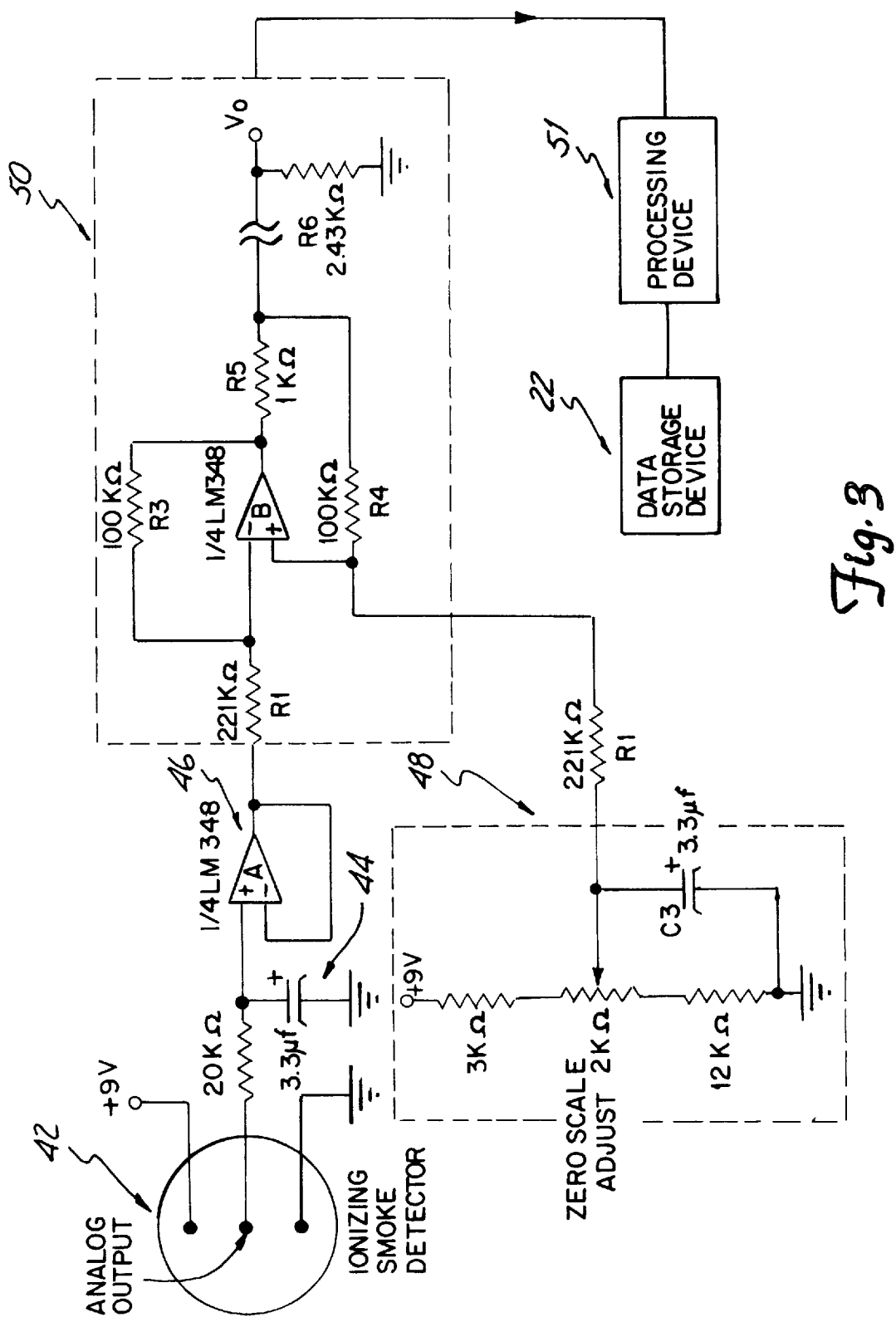
FIG. 3 is a schematic diagram of a particle sensor employed in the monitoring system of the present invention.

FIG. 3 is a schematic diagram of a smoke or particle sensor, which may be employed for measuring air quality at a site 12. As shown, the sensor 14 includes an ionizing smoke or particle sensor 42, a capacitance filter 44, a signal amplifier 46, a zero scale adjustor 48 and a voltage to current converter 50. The ionizing particle sensor 42 includes a plurality of electrodes for attracting smoke or particles and producing an output voltage proportional to the particles detected. An ionizing smoke or particle detector is commercially available from Dicon Safety Products, Inc. of Toronto, Ontario, Canada and can be adapted for use as a sensor by modifying the device to output a voltage proportional to the particles detected by the electrodes.

As shown in FIG. 3, the voltage generated by the sensor 42 corresponding to the particulate mass is filtered by capacitance filter 44 to reduce noise and is amplified by signal buffer amplifier 46, which can be a voltage follower circuit. The voltage output by the sensor 42 is converted to current by converter 50. The converted voltage output (current) is transmitted through wires to a central processing device 51 (spaced from sensor 42, amplifier 46 and converter 50) and the voltage is transmitted to the data storage device 22 for storage. The voltage output is converted to current by converter 50 so that the signal is not degraded when the signal transmitted through a long wire to a central remote processing device 51. If the voltage is directly processed and stored by the data storage device 22, and is not transmitted a significant distance, then the voltage to current converter 50 may be eliminated.

The zero scale adjustor 48 is a potentiometer circuit for providing a reference adjustment for the output of amplifier 46. Preferably, the zero scale adjustor 48 is set to roughly the clean air output of amplifier 46 minus 0.1 volts. Thus, sensor 42 generates a voltage signal relative to air quality, which is buffered, converted to current, transmitted and continuously outputted as a voltage to the processing device 51 for collection and storage at selected intervals. For example, sensor 42 may output a voltage ranging from 7.0 volts–4.8 volts to produce a current of 0 milliampere–1 milliampere, respectively, which is converted to produce a 0 volt–2.5 volt output corresponding to air cleanliness as sensed by sensor 42.

Figure 4:
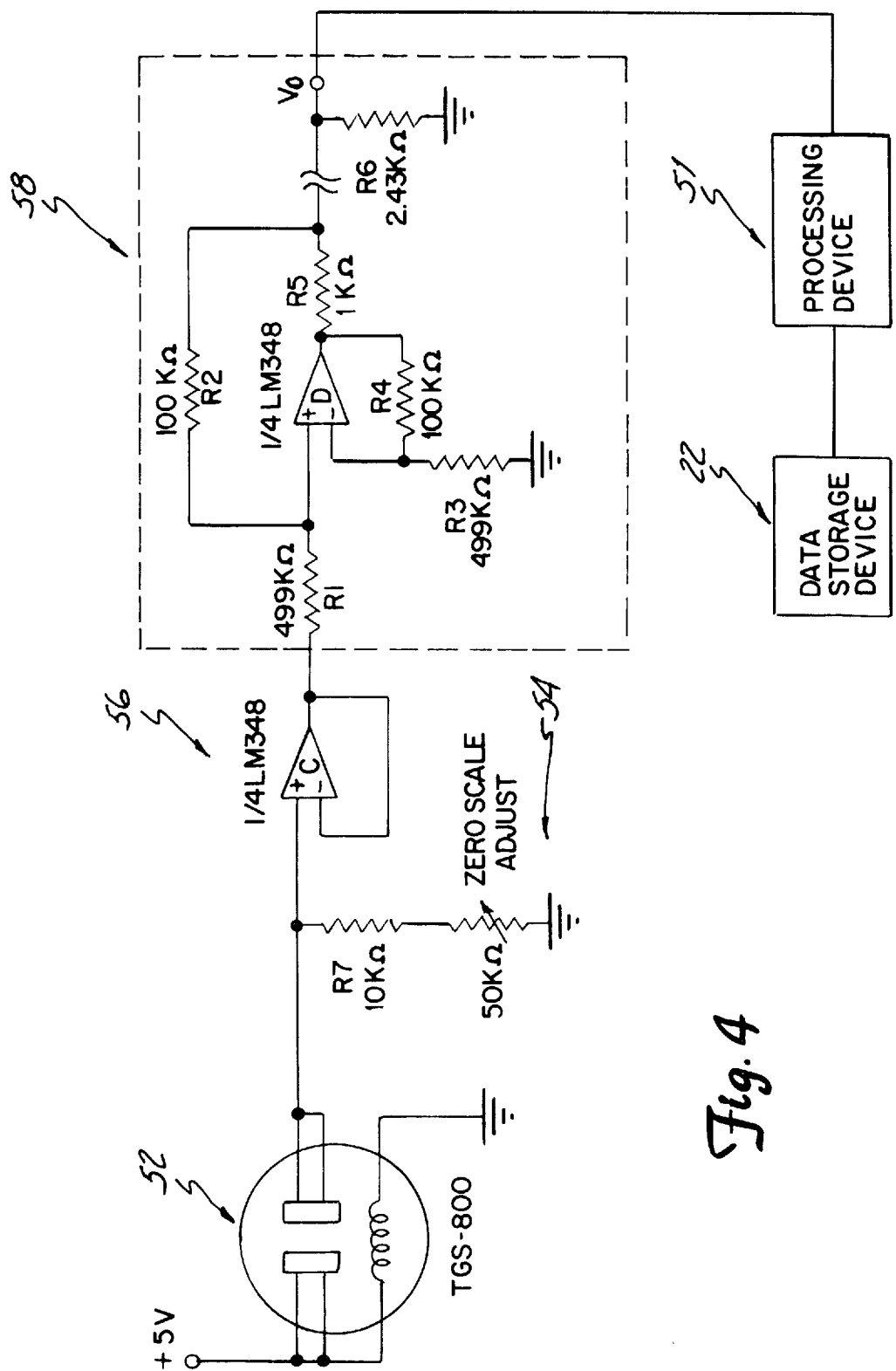
FIG. 4 is a schematic diagram of a volatile residue sensor of the monitoring system of the present invention.

FIG. 4 is a schematic diagram of a volatile organic compound (VOC) sensor, which may be employed for measuring air quality at a particular site 14. As shown, the volatile organic compound sensor includes a sensor 52, such as a TGS-800 Model sensor available from Figaro, Inc. of Wilmette, Illinois, a zero scale adjustor 54, a signal amplifier buffer 56 and a voltage to current converter 58. The sensor produces a voltage corresponding to the concentration of VOC present in the air.

The voltage signal is buffered by signal amplifier 56. The zero scale adjustor 54 circuit is coupled to the output of sensor 52 to adjust the output voltage of the sensor so that the output of the amplified voltage of the volatile residue sensor 52 is approximately 1.25 V in clean air after the VOC sensor 52 has reached temperature stability. The output voltage from the amplifier 56 is converted to current by the voltage to current converter 58 and transmitted to the processing device 51 and data storage device 22 for storage.

The output voltage of sensors 14a–d is converted to an air quality measurement. Preferably, the air quality measurement is in milligrams of particles per cubic meters of air for particles and parts per million for VOC. The voltage data collected from sensors 14a–d is stored by data storage device 22 and systematically uploaded to the remote central database 30. Preferably, the remote data collection system 18 includes software to convert the voltage output of sensors to an air quality measurement, such as milligrams of particles per cubic meters of air. Since the voltage output of the sensors is converted by the remote data collection system 18, a single calibration system can be used which can be easily changed (i.e. updated or corrected) at one location without visiting a plurality of monitoring sites.

Although the present invention has been described with reference to preferred embodiments, workers skilled in the art will recognize that changes may be made in form and detail without departing from the spirit and scope of the invention.

What is claimed is:

1. An air quality monitoring system comprising:
    a data acquisition system for collecting air quality data at a data acquisition site, said data acquisition system including:
    at least one sensor for measuring air quality data;
    a data storage device coupled to the sensor for storing data measured by the sensor;
    a remote access device coupled to the data storage device for electronically accessing measured data stored on the data storage device from a remote system;
    means for converting sensor data to an air quality measurement based upon sensor type;
    a remote database for storing air quality data from a plurality of data acquisition systems;
    a remote access device coupled to the remote database for electronically accessing the remote database for uploading and storing measured data from data acquisition sites; and
    means for systematically and automatically uploading data from acquisition sites to the remote database.

2. The air quality monitoring system of claim 1 including a plurality of sensors at a data acquisition site, said plurality of sensors being coupled to the data storage device.

3. The air quality monitoring system of claim 2 wherein the sensors are fixedly installed at distributed locations at a site and coupled to the data storage device.

4. The air quality monitoring system of claim 3 wherein the sensors output a voltage signal proportional to the measured air quality and a voltage to current converter is included to convert the voltage to current to transmit the measurement to a processing device for storage by a data storage device.

5. The air quality monitoring system of claim 4 wherein the remote database includes a system for converting the voltage to an air quality measurement.

6. The air quality monitoring system of claim 2 and including a site controller coupled to the sensors and programmed to systematically initiate collection of environment data at defined intervals from the sensors and storing said data to the data storage device.

7. The air quality monitoring system of claim 2 including a plurality of sensors which measure different air quality attributes coupled to a data storage device and means for converting the measurements to air quality data based upon the sensor type of the measured data.

8. The air quality monitoring system of claim 1 wherein the sensor includes an ionizing particle sensor device.

9. The air quality monitoring system of claim 1 wherein the sensor includes a volatile organic compound (VOC) sensor.

10. The air quality monitoring system of claim 1 wherein the air quality data is stored via a site identification number on the remote database.

11. The air quality monitoring system of claim 1 wherein the remote database is coupled to a printer for generating reports of the air quality data.

12. The air quality monitoring system of claim 1 wherein the remote database is coupled to a distributed wide area network for remote access to the database.

13. The air quality monitoring system of claim 12 wherein the environment data is stored by site and is accessible through the distributed wide area network by password codes.

14. The air quality monitoring system of claim 1 wherein the site controller is programmed to initiate remote electronic communications with the remote database to upload data.

15. The air quality monitoring system of claim 1 wherein the remote database includes a controller programmed to initiate remote electronic communications with the data storage devices of various sites for uploading data from the various sites to the remote database.

16. A method for monitoring air quality comprising the steps of:
    providing a data acquisition system at a data acquisition site including at least one sensor for measuring air quality data coupled to a data storage device, said data storage device including a remote access device for electronic remote access to the data storage device;

providing a remote database for storing air quality data from various data acquisition sites, said remote database including a remote access device for electronically remotely accessing the database;

collecting a measurement from a sensor;

transmitting the measurement to the data storage device at the data acquisition site for storage;

automatically electronically connecting to the remote database and uploading the measurement data to the remote database for storage; and converting measurements to air quality data based upon sensor type and storing the air quality data in the remote database.

17. The method for monitoring air quality of claim 16 wherein air quality data is uploaded to and stored in the remote database according to data acquisition site.

18. The method for monitoring air quality of claim 16 wherein the data acquisition site includes a plurality of sensors and including the steps of:

measuring air quality data via a plurality of sensors;

transmitting the air quality data from the sensors to the data storage device at the data acquisition site.

19. The method for monitoring air quality of claim 16 including the steps of:

generating measured air quality data reports by data acquisition site; and printing measured air quality data reports.

20. The method of claim 16 sand including the steps of:

measuring a plurality of air quality attributes via a plurality of different sensors; and converting the measurements to air quality data based upon the sensor type.

* * * * *